United States Patent
Kotecki

(10) Patent No.: US 11,624,576 B1
(45) Date of Patent: Apr. 11, 2023

(54) WEAPON REST ASSEMBLY

(71) Applicant: Michael B. Kotecki, Fruitport, MI (US)

(72) Inventor: Michael B. Kotecki, Fruitport, MI (US)

( * ) Notice: Subject to any disclaimer, the term of this patent is extended or adjusted under 35 U.S.C. 154(b) by 0 days.

(21) Appl. No.: 17/539,982

(22) Filed: Dec. 1, 2021

(51) Int. Cl.
 *F41A 23/06* (2006.01)
 *A01M 31/02* (2006.01)
 *F41B 5/14* (2006.01)

(52) U.S. Cl.
 CPC ............ *F41A 23/06* (2013.01); *F41B 5/1453* (2013.01); *A01M 31/02* (2013.01)

(58) Field of Classification Search
 CPC ........ A01M 31/02; F41A 23/06; F41B 5/1453
 USPC .............................................. 42/94; 89/37.04
 See application file for complete search history.

(56) References Cited

U.S. PATENT DOCUMENTS

| | | | |
|---|---|---|---|
| 5,414,949 A | 5/1995 | Peebles | |
| D382,035 S | 8/1997 | Swicegood | |
| 5,685,104 A | 11/1997 | Breazeale | |
| 6,637,708 B1 | 10/2003 | Peterson | |
| 9,441,902 B2 | 9/2016 | Noel | |
| 10,660,326 B2 | 5/2020 | LeBire | |
| 2013/0145671 A1 | 6/2013 | Cavell | |

FOREIGN PATENT DOCUMENTS

CA 3052011 2/2020

*Primary Examiner* — Reginald S Tillman, Jr.

(57) ABSTRACT

A weapon rest assembly for stabilizing a weapon while shooting includes a post, which is engaged to and extends from a first end of a beam. The post comprises a plurality of nestable segments so that the post is selectively length adjustable. A rest is engaged to the post distal from the beam. A first attachment module is selectively engageable to the beam and is mountable to a tree stand so that the beam is mounted to the tree stand. A weapon held by a shooter positioned in the tree stand can be positioned on the rest to stabilize the weapon. A second attachment module is selectively engageable to the beam and is mountable to the ground so that the beam is mounted to the ground. A weapon held by a shooter positioned on the ground can be positioned on the rest to stabilize the weapon.

14 Claims, 6 Drawing Sheets

WEAPON REST ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rest assemblies and more particularly pertains to a new rest assembly for stabilizing a weapon while shooting. The present invention discloses a rest assembly which is compatible with both long guns and crossbows, which is vertically adjustable, and which is selectively attachable to a tree stand and to the ground.

(2) Description of Related Art Including Information Disclosed Under 37 CFR 1.97 and 1.98

The prior art relates to rest assemblies, which may comprise rest assemblies which are compatible with long guns and which are attachable to tree stands or are positionable upon the ground. What is lacking in the prior art is a rest assembly which is compatible with both long guns and crossbows, which is vertically adjustable, and which is selectively attachable to a tree stand and to the ground.

BRIEF SUMMARY OF THE INVENTION

An embodiment of the disclosure meets the needs presented above by generally comprising a post, which is engaged to and extends from a first end of a beam. The post comprises a plurality of nestable segments so that the post is selectively length adjustable. A rest is engaged to the post distal from the beam. A first attachment module is selectively engageable to the beam and is configured to be mountable to a tree stand so that the beam is mounted to the tree stand. The rest is configured for positioning of a weapon held by a shooter positioned in the tree stand to stabilize the weapon. A second attachment module is selectively engageable to the beam and is configured to be mountable to the ground so that the beam is mounted to the ground. The rest is configured for positioning of a weapon held by a shooter positioned on the ground to stabilize the weapon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
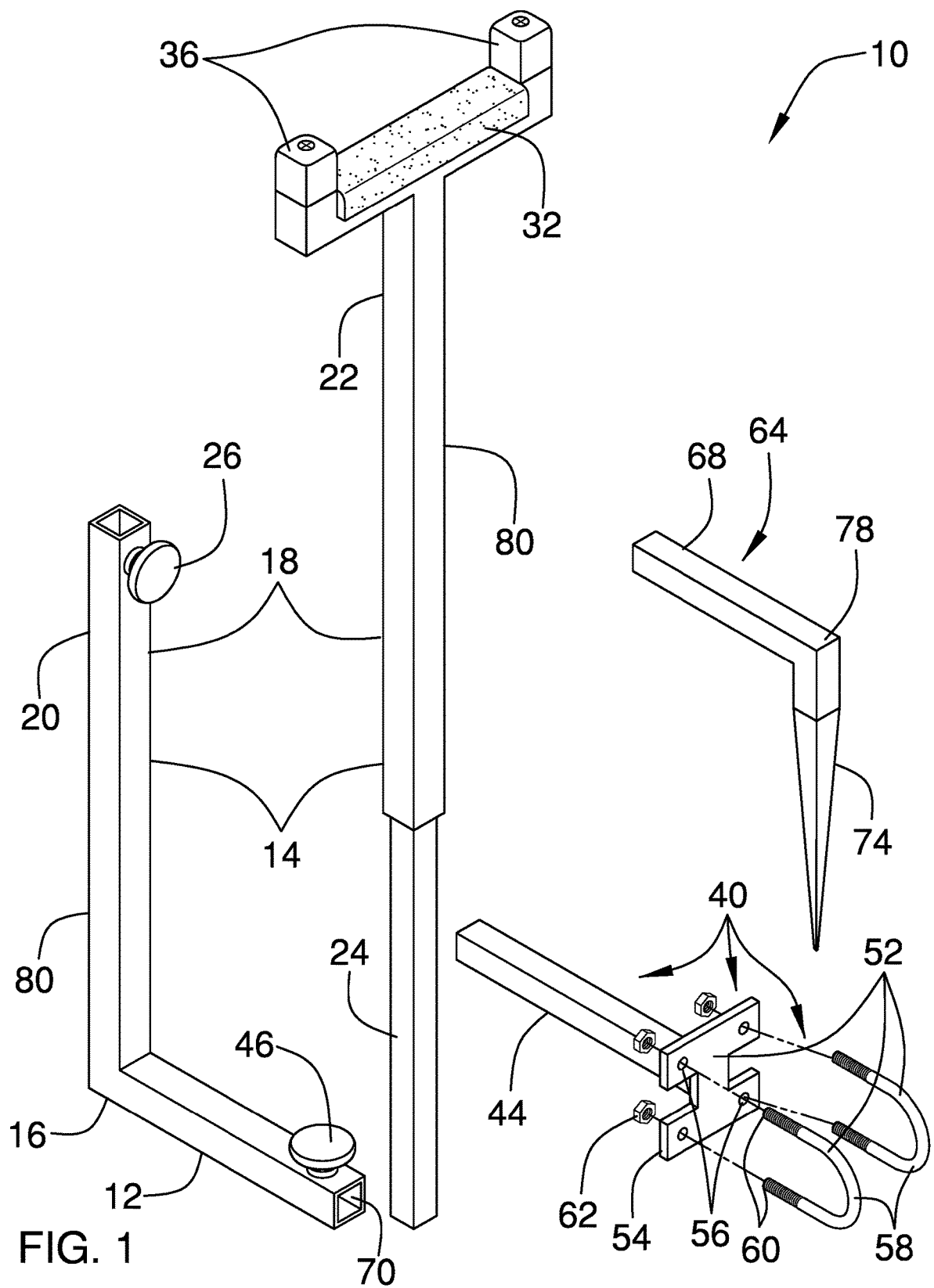
FIG. 1 is an exploded view of a weapon rest assembly according to an embodiment of the disclosure.
Figure 2:
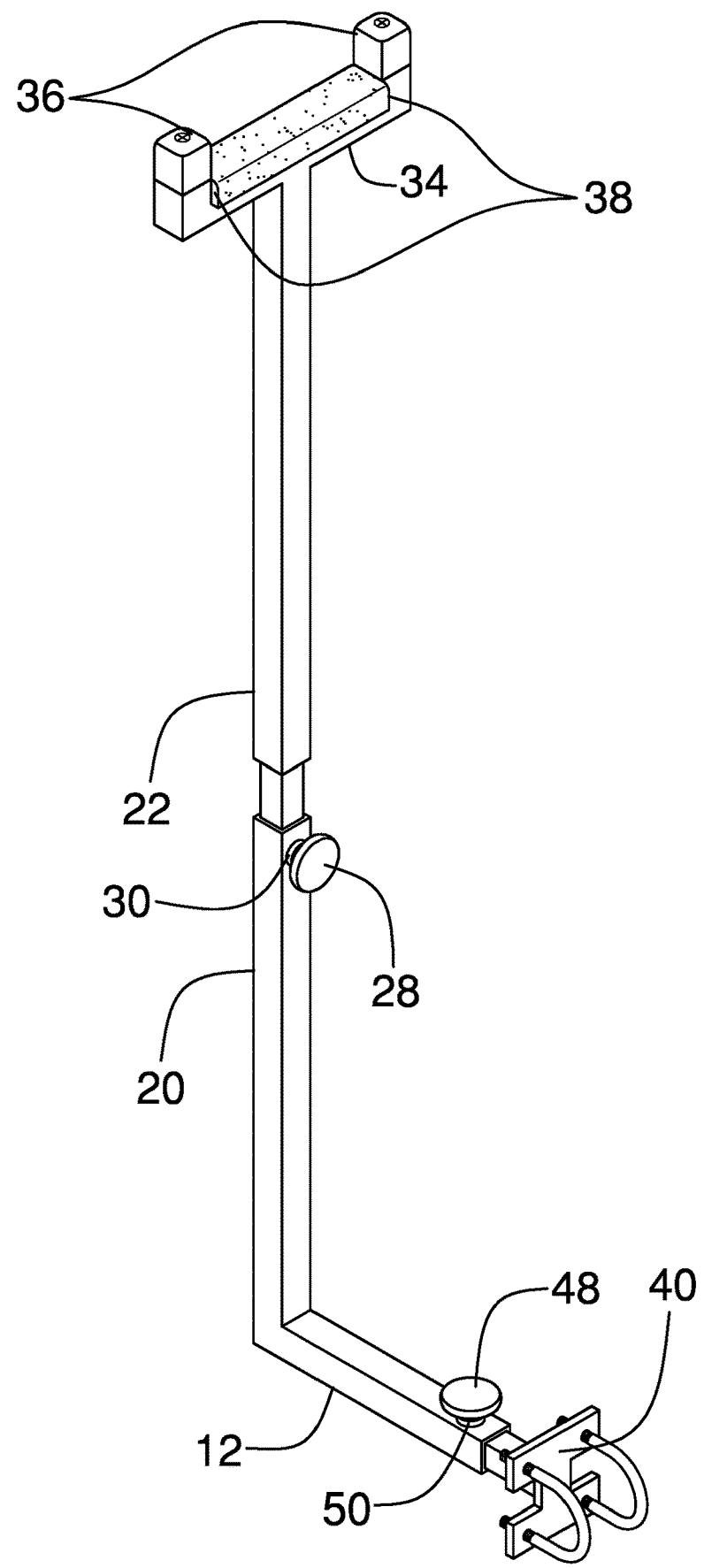
FIG. 2 is an isometric perspective view of an embodiment of the disclosure.

With reference now to the drawings, and in particular to FIGS. 1 through 6 thereof, a new rest assembly embodying the principles and concepts of an embodiment of the disclosure and generally designated by the reference numeral 10 will be described.

As best illustrated in FIGS. 1 through 6, the weapon rest assembly 10 generally comprises a beam 12, which is tubular. A post 14 is engaged to and extends from a first end 16 of the beam 12. The present invention also anticipates the post 14 being selectively engageable to the beam 12.

The post 14 comprises a plurality of nestable segments 18 so that the post 14 is selectively length adjustable. The plurality of nestable segments 18 may comprises a first segment 20, which is tubular, and a second segment 22, although the present invention anticipates the plurality of nestable segments 18 comprising three or more nestable segments 18. The first segment 20 is engaged to the post 14. A first section 24 of the second segment 22 is circumferentially smaller than a second section 80 of the second segment 22, which is substantially circumferentially equivalent to the first segment 20.

The second segment 22 is selectively nestable with and engageable to the first segment 20. The first section 24 is selectively insertable into the first segment 20 to removably engage the second segment 22 to the first segment 20.

A fastener 26 is engaged to of the first segment 20 and is selectively engageable to the first section 24 the second segment 22 so that the second segment 22 is selectively positionable along the first section 24. The fastener 26 may comprise a fastening thumbscrew 28, a wingbolt, or the like, which is positioned for selective threaded insertion into a threaded hole 30 that is positioned in the first segment 20. The fastener 26 may comprise other fastening means, such as, but not limited to, cotter pins, bolts, and the like.

Figure 3:
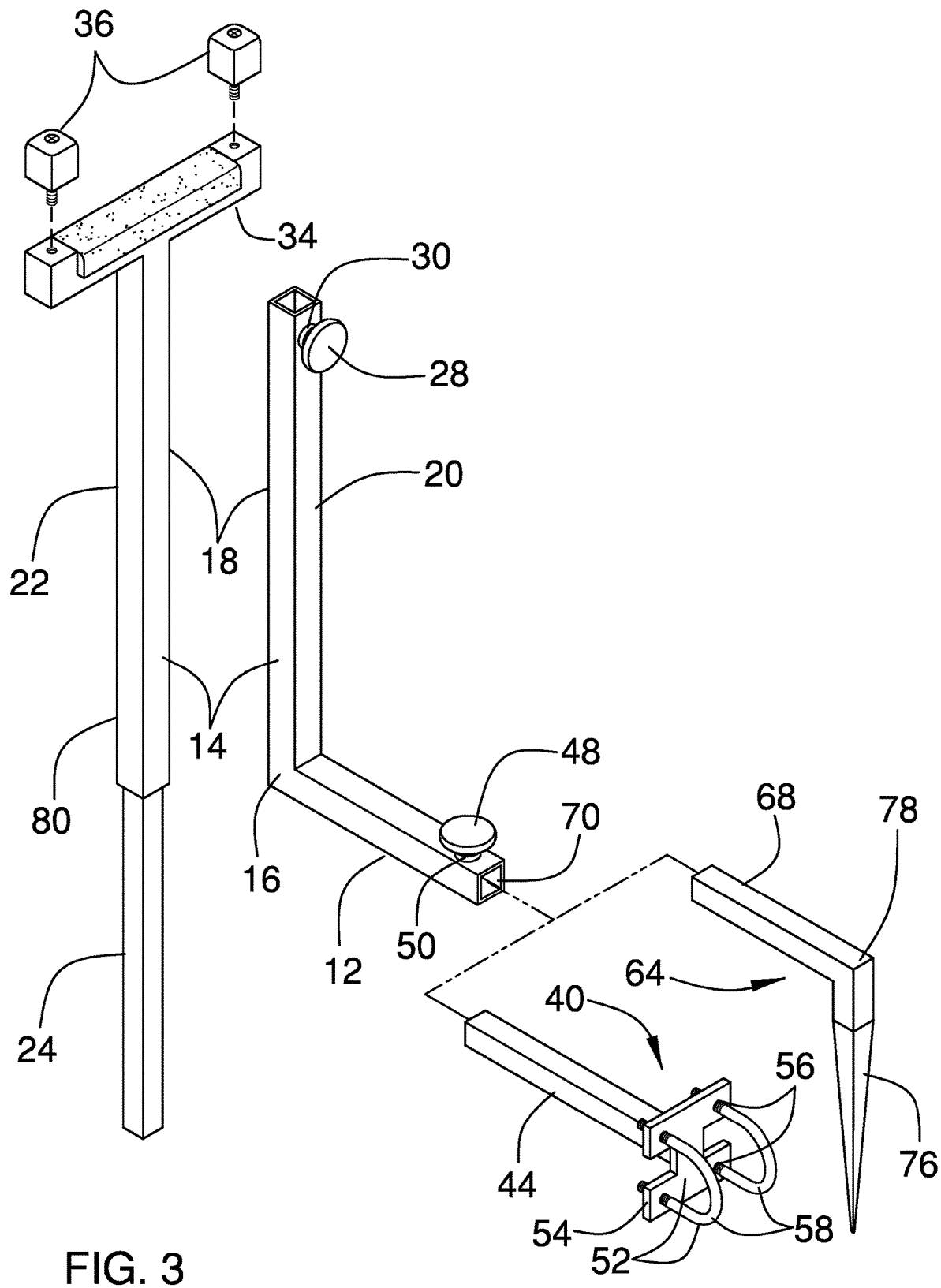
FIG. 3 is a detail view of an embodiment of the disclosure.
Figure 4:
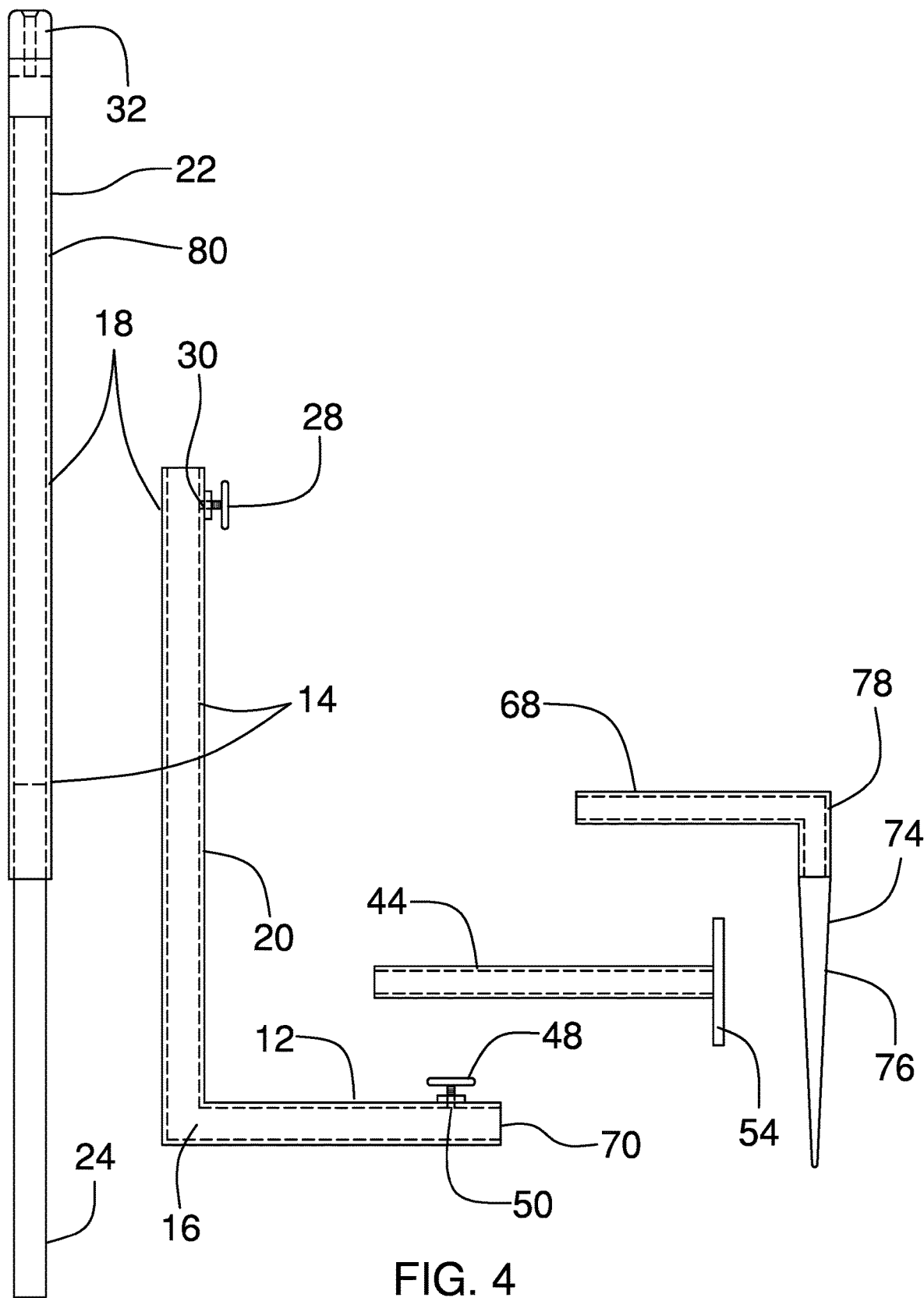
FIG. 4 is a cross-sectional view of an embodiment of the disclosure.

A rest 32 is engaged to the post 14 distal from the beam 12. The rest 32 is padded to reduce marring of a weapon that is positioned on the rest 32. The rest 32 being padded also serves to frictionally engage the weapon to the rest 32. The rest 32 comprises a crossbar 34, which extends bidirectionally from the post 14. Each of a pair of uprights 36 is engaged to and extends from a respective opposed end 38 of the crossbar 34. As shown in FIG. 3, the uprights 36 may be threadedly engageable to the crossbar 34. The crossbar 34 is configured to selectively stabilize a long gun and a crossbow.

A first attachment module 40 is selectively engageable to the beam 12 and is configured to be mountable to a tree stand 42 so that the beam 12 is mounted to the tree stand 42. The rest 32 thus is configured for positioning of a weapon, such as a long gun or a crossbow, held by a shooter positioned in the tree stand 42, to stabilize the weapon.

The first attachment module 40 comprises a bar 44, which is selectively insertable into a second end 70 of the beam 12. A first coupler 46 is engaged to the beam 12 and is selectively couplable to the bar 44 so that the bar 44 is engaged to and extends linearly from the beam 12. The first coupler 46 may comprise a coupling thumbscrew 48, a wingbolt, or the like, which is selectively threadedly insertable into a threaded aperture 50, which is positioned in the beam 12 to frictionally engage the bar 44 to the beam 12.

Figure 5:
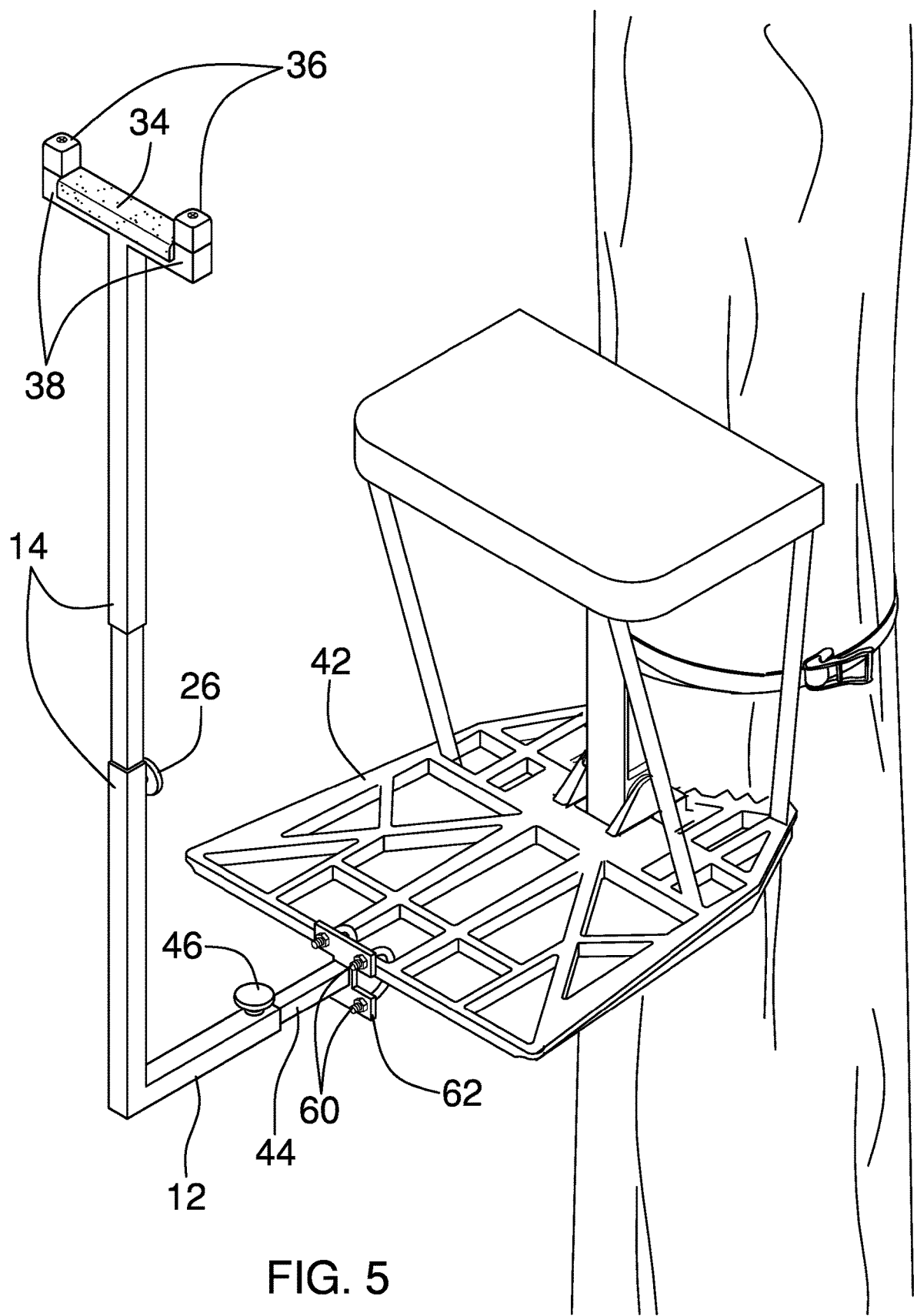
FIG. 5 is an in-use view of an embodiment of the disclosure.

A second coupler 52 engaged to the bar 44 and is configured to selectively engage the tree stand 42 so that the bar 44 is mounted to the tree stand 42. The second coupler 52 may comprise a plate 54, which is engaged to the bar 44 so that the bar 44 extends substantially perpendicularly from the plate 54. A plurality of insertion holes 56 is positioned in the plate 54. Each of a pair of U-bolts 58 is configured for positioning around a respective element of the tree stand 42 so that opposing ends 60 of the U-bolt 58 are insertable through respective insertion holes 56, as shown in FIG. 5. Each opposed end 60 of the U-bolt 58 is positioned to threadedly engage a respective nut 62 to mount the bar 44 to the tree stand 42. The present invention anticipates the bar 44 being mountable to the tree stand 42 by other mounting means, such as, but not limited to, clamps, brackets, and the like.

Figure 6:
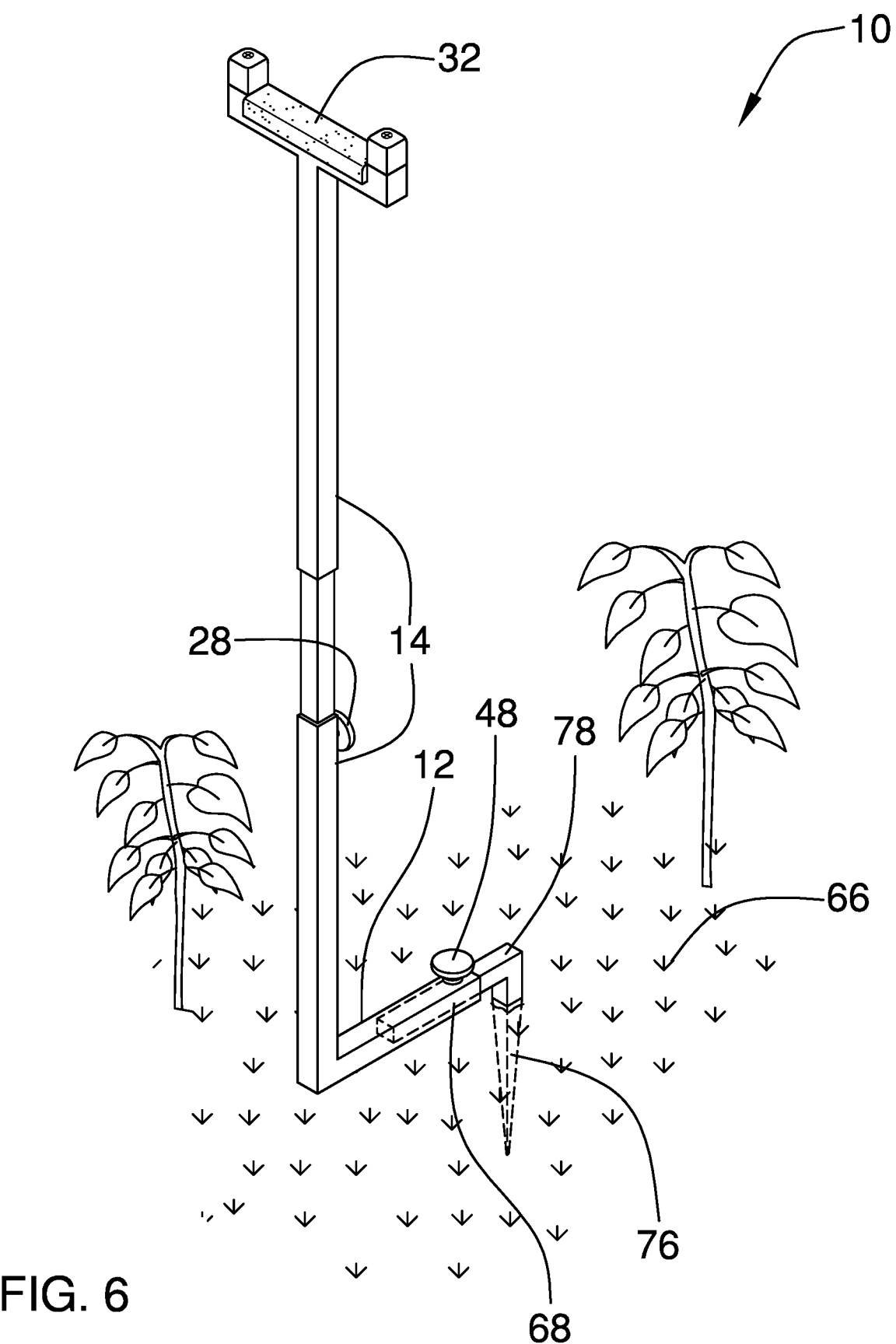
FIG. 6 is an in-use view of an embodiment of the disclosure.

A second attachment module 64 is selectively engageable to the beam 12 and is configured to be mountable to the ground 66 so that the beam 12 is mounted to the ground 66, as shown in FIG. 6. The rest 32 thus is configured for positioning of a weapon held by a shooter positioned on the ground 66 to stabilize the weapon.

The second attachment module 64 comprises a rod 68, which is selectively insertable into the second end 70 of the beam 12. The coupling thumbscrew 48 is used to frictionally engaged the rod 68 to the beam 12. A connector 74 engaged to the rod 68 and is configured to selectively engage the ground 66 so that the rod 68 is mounted to the ground 66, as shown in FIG. 6. The connector 74 may comprise a spike 76, which is engaged to and which extends from a terminus 78 of the rod 68. The spike 76 is configured to penetrate the ground 66 to engage the rod 68 to the ground 66. Other means of attaching or stabilizing the weapon rest assembly 10 upon the ground 66 are anticipated by the present invention, such as, but not limited to, base plates, stands, and the like.

As shown in FIGS. 1-6, the weapon rest assembly 10 comprises substantially square tubing. The present invention also anticipates the weapon rest assembly 10, or components thereof, comprising round tubing, triangular tubing, L-channel, C-channel, and the like. The weapon rest assembly 10 may comprise aluminum, titanium, steel, and the like.

In one example of use, a tree stand 42 is engaged to a tree. The bar 44 then is mounted to the tree stand 42 and the beam 12 is engaged to the bar 44. The second segment 22 of the post 14 then is attached to the first section 24 of the first segment 20 of the post 14 so that the rest 32 is positioned at a desired height relative to the tree stand 42. The rest 32 is configured for positioning of a weapon held by a shooter positioned in the tree stand 42. The rest 32 stabilizes the weapon, allowing for a more accurate shot.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weapon rest assembly comprising:
   a beam;
   a post engaged to and extending from a first end of the beam, the post comprising a plurality of nestable segments, such that the post is selectively length adjustable;
   a rest engaged to the post distal from the beam;
   a first attachment module selectively engageable to the beam and being configured to be mountable to a tree stand, such that the beam is mounted to the tree stand, wherein the rest is configured for positioning of a weapon held by a shooter positioned in the tree stand for stabilizing the weapon; and
   a second attachment module selectively engageable to the beam and being configured to be mountable to the ground, such that the beam is mounted to the ground, wherein the rest is configured for positioning of a weapon held by a shooter positioned on the ground for stabilizing the weapon.

2. The weapon rest assembly of claim 1, wherein the rest is padded.

3. The weapon rest assembly of claim 1, wherein the plurality of nestable segments comprises:
   a first segment engaged to the post; and
   a second segment selectively nestable with and engageable to the first segment.

4. The weapon rest assembly of claim 3, wherein:
a first section of the second segment is circumferentially smaller than a second section of the first segment; and
the first segment is tubular and substantially circumferentially equivalent to the second section of the second segment, such that the first section is selectively insertable into the first segment for removably engaging the second segment to the first segment.

5. The weapon rest assembly of claim 4, further including a fastener engaged to the first segment and being selectively engageable to the first section of the second segment, such that the second segment is selectively positionable along the first section.

6. The weapon rest assembly of claim 5, wherein the fastener comprises a fastening thumbscrew, such that the fastening thumbscrew is positioned for selective insertion into a threaded hole positioned in the first segment.

7. The weapon rest assembly of claim 1, wherein the rest comprises:
a crossbar extending bidirectionally from the post; and
a pair of uprights, each upright being engaged to and extending from a respective opposed end of the crossbar, wherein the crossbar is configured for selectively stabilizing a long gun and a crossbow.

8. The weapon rest assembly of claim 1, wherein:
the beam is tubular; and
the first attachment module comprises:
a bar selectively insertable into a second end of the beam,
a first coupler engaged to the beam and being selectively couplable to the bar, such that the bar is engaged to and extends linearly from the beam, and
a second coupler engaged to the bar and being configured for selectively engaging the tree stand, such that the bar is mounted to the tree stand.

9. The weapon rest assembly of claim 8, wherein the first coupler comprises a coupling thumbscrew, such that the coupling thumbscrew is selectively insertable into a threaded aperture positioned in the beam for frictionally engaging the bar to the beam.

10. The weapon rest assembly of claim 8, wherein the second coupler comprises:
a plate engaged to the bar, such that the bar extends substantially perpendicularly from the plate;
a plurality of insertion holes positioned in the plate; and
a pair of U-bolts, wherein each U-bolt is configured for positioning around a respective element of the tree stand, such that opposing ends of the U-bolt are insertable through respective insertion holes, positioning each opposed end for threadedly engaging a respective nut for mounting the bar to the tree stand.

11. The weapon rest assembly of claim 9, wherein:
the beam is tubular; and
the second attachment module comprises:
a rod selectively insertable into the second end of the beam, such that the coupling thumbscrew is positioned for frictionally engaging the rod to the beam, and
a connector engaged to the rod and being configured for selectively engaging the ground, such that the rod is mounted to the ground.

12. The weapon rest assembly of claim 11, wherein the connector comprises a spike engaged to and extending from a terminus of the rod, wherein the spike is configured for penetrating the ground for engaging the rod to the ground.

13. A weapon rest system comprising:
a tree stand engaged to a tree;
a beam;
a post engaged to and extending from a first end of the beam, the post comprising a plurality of nestable segments, such that the post is selectively length adjustable;
a rest engaged to the post distal from the beam;
a first attachment module selectively engageable to the beam and being mounted to the tree stand, such that the beam is mounted to the tree stand, wherein the rest is configured for positioning of a weapon held by a shooter positioned in the tree stand for stabilizing the weapon; and
a second attachment module selectively engageable to the beam and being configured to be mountable to the ground, such that the beam is mounted to the ground, wherein the rest is configured for positioning of a weapon held by a shooter positioned on the ground for stabilizing the weapon.

14. A weapon rest assembly comprising:
a beam, the beam being tubular;
a post engaged to and extending from a first end of the beam, the post comprising a plurality of nestable segments, such that the post is selectively length adjustable, the plurality of nestable segments comprising:
a first segment engaged to the post, the first segment being tubular, and
a second segment selectively nestable with and engageable to the first segment, a first section of the second segment being circumferentially smaller than a second section of the first segment, the second section being substantially circumferentially equivalent to the first segment, such that the first section is selectively insertable into the first segment for removably engaging the second segment to the first segment;
a fastener engaged to the first segment and being selectively engageable to the first section of the second segment, such that the second segment is selectively positionable along the first section, the fastener comprising a fastening thumbscrew, such that the fastening thumbscrew is positioned for selective insertion into a threaded hole positioned in the first segment;
a rest engaged to the post distal from the beam, the rest being padded, the rest comprising:
a crossbar extending bidirectionally from the post, and
a pair of uprights, each upright being engaged to and extending from a respective opposed end of the crossbar, wherein the crossbar is configured for selectively stabilizing a long gun and a crossbow;
a first attachment module selectively engageable to the beam and being configured to be mountable to a tree stand, such that the beam is mounted to the tree stand, wherein the rest is configured for positioning of a weapon held by a shooter positioned in the tree stand for stabilizing the weapon, the first attachment module comprising:
a bar selectively insertable into a second end of the beam,
a first coupler engaged to the beam and being selectively couplable to the bar, such that the bar is engaged to and extends linearly from the beam, the first coupler comprising a coupling thumbscrew, such that the coupling thumbscrew is selectively insertable into a threaded aperture positioned in the beam for frictionally engaging the bar to the beam, and a second coupler engaged to the bar and being configured for selectively engaging the tree stand, such that the bar is mounted to the tree stand, the second coupler comprising:
    a plate engaged to the bar, such that the bar extends substantially perpendicularly from the plate,
    a plurality of insertion holes positioned in the plate, and
    a pair of U-bolts, wherein each U-bolt is configured for positioning around a respective element of the tree stand, such that opposing ends of the U-bolt are insertable through respective insertion holes, positioning each opposed end for threadedly engaging a respective nut for mounting the bar to the tree stand; and a second attachment module selectively engageable to the beam and being configured to be mountable to the ground, such that the beam is mounted to the ground, wherein the rest is configured for positioning of a weapon held by a shooter positioned on the ground for stabilizing the weapon, the second attachment module comprising:
    a rod selectively insertable into the second end of the beam, such that the coupling thumbscrew is positioned for frictionally engaging the rod to the beam, and
    a connector engaged to the rod and being configured for selectively engaging the ground, such that the rod is mounted to the ground, the connector comprising a spike engaged to and extending from a terminus of the rod, wherein the spike is configured for penetrating the ground for engaging the rod to the ground.

* * * * *